(12) United States Patent
Tanaka et al.

(10) Patent No.: US 7,974,668 B2
(45) Date of Patent: Jul. 5, 2011

(54) ELECTRONIC APPARATUS

(75) Inventors: Hiroyuki Tanaka, Kawasaki (JP);
Yoshifumi Kajiwara, Kawasaki (JP);
Hiroaki Sakashita, Kawasaki (JP);
Yoshiya Matsumoto, Kawasaki (JP);
Kazunori Murayama, Kawasaki (JP);
Atsuko Yamamoto, Kawasaki (JP);
Takehisa Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 839 days.

(21) Appl. No.: 11/954,487

(22) Filed: Dec. 12, 2007

(65) Prior Publication Data
US 2008/0142656 A1  Jun. 19, 2008

(30) Foreign Application Priority Data

Dec. 15, 2006  (JP) ................... 2006-339257

(51) Int. Cl.
*H04M 1/00* (2006.01)
(52) U.S. Cl. ............... 455/575.8; 455/575.3; 455/575.1; 455/90.3; 455/347; 379/428.01; 379/429; 379/433.13
(58) Field of Classification Search ............... 455/575.3, 455/575.1, 575.8, 90.3, 347; 379/428.01, 379/429, 433.13
See application file for complete search history.

(56) References Cited

U.S. PATENT DOCUMENTS

| 6,256,481 | B1 | 7/2001 | Jeong et al. |
| 7,194,291 | B2 * | 3/2007 | Peng ..................... 455/575.8 |
| 7,495,895 | B2 * | 2/2009 | Carnevali ............. 361/679.26 |
| 2004/0204176 | A1 * | 10/2004 | Park ........................ 455/572 |

FOREIGN PATENT DOCUMENTS

| JP | 7-7274 A | 1/1995 |
| JP | 2000-22790 | 1/2000 |
| JP | 2002261902 A | 9/2002 |

* cited by examiner

*Primary Examiner* — Michael T Thier
*Assistant Examiner* — Shantell Heiber
(74) *Attorney, Agent, or Firm* — Westerman, Hattori, Daniels & Adrian, LLP

(57) ABSTRACT

Guiding pieces on a bracket cover is engaged with attachment claws on a bracket body. This engagement serves to hold the bracket cover on the bracket body when the bracket cover is set at a first position. When the bracket cover is set at a second position, the engagement between an engagement piece and a hook piece serves to cooperate with the engagement between the guiding pieces and the attachment claws so as to hold the bracket cover on the bracket body. The bracket cover is firmly held on the bracket body when the bracket cover is set at the second position. The bracket cover is thus reliably prevented from detachment from the bracket body.

5 Claims, 14 Drawing Sheets

ELECTRONIC APPARATUS

BACKGROUND OF THE INVENTION

1. Field of the Invention

The present invention relates to an electronic apparatus such as a cellular or mobile phone terminal.

2. Description of the Prior Art

A printed circuit board and a display panel unit are incorporated in the enclosure of a mobile phone terminal. The enclosure includes a base and a cover. The cover is engaged with the base by use of attachment claws, for example. The cover is fixed on the base in this manner.

The conventional mobile phone terminal allows an easier detachment of the cover from the base since the attachment claws are utilized to simply engage the cover with the base. Someone may intentionally modify or break the printed circuit board and/or the display panel unit within the enclosure, for example.

SUMMARY OF THE INVENTION

It is accordingly an object of the present invention to provide an electronic apparatus capable of firmly fixing a bracket cover to a bracket body.

According to the present invention, there is provided an electronic apparatus comprising: a first enclosure; a bracket body coupled to a first enclosure for relative rotation around a first rotation axis parallel to a flat front surface of the first enclosure, the bracket body defining peripheral edges at least partly extending along a pair of parallel lines, respectively; a second enclosure superposed on the front surface of the bracket body, the second enclosure coupled to the bracket body for relative rotation around a second rotation axis intersecting with the front surface of the bracket body; a bracket cover covering over the back surface of the bracket body: at least a pair of attachment claws formed on the back surface of the bracket body, the attachment claws extending from the peripheral edges of the bracket body in opposite directions along an imaginary plane including the back surface of the bracket body; a pair of guiding pieces formed on the bracket cover to engage with the attachment claws respectively at the surface facing away from the bracket cover, the guiding pieces guiding at least the movement of the bracket cover along the peripheral edges of the bracket body between first and second positions; an engagement piece formed on the bracket body at a position opposed to the back surface of the bracket body at a predetermined distance, the engagement piece forming an insertion space between the bracket body and the engagement piece itself; and a hook piece formed on the bracket cover, the hook piece exiting from the insertion space when the bracket cover is set at the first position, the hook piece entering the insertion space when the bracket cover is set at the second position.

The guiding pieces in engagement with the attachment claws serves to hold the bracket cover on the bracket body in the electronic apparatus when the bracket cover is set at the first position. When the bracket cover is set at the second position, the engagement between the engagement piece and the hook piece serves to cooperate with the engagement between the guiding pieces and the attachment claws so as to hold the bracket cover on the bracket body. The bracket cover is firmly held on the bracket body when the bracket cover is set at the second position. The bracket cover is thus reliably prevented from detachment from the bracket body. The electronic apparatus may allow a predetermined elastic deformation of the bracket cover.

The electronic apparatus may allow the individual attachment claw to define, each of the attachment claws may define an inclined surface gradually getting closer to the imaginary plane as the position gets farther in the outward direction from the peripheral edge of the bracket body. An urging force is applied to the bracket cover against the bracket body for attachment of the bracket cover to the bracket body. The guiding pieces are allowed to slide on the inclined surfaces of the corresponding attachment claws, respectively. The guiding pieces are thus engaged with the attachment claws in a facilitated manner.

The electronic apparatus may further comprise: a swell extending on the peripheral edge of the bracket body from the attachment claw to the front surface of the bracket body; and a recess formed on the edge of the guiding piece, the recess receiving the swell on the attachment claw when the bracket cover is set at the second position. When the protrusion is received in the recess, the bracket cover is firmly held at the second position.

The electronic apparatus may further comprise: an engagement claw formed on the bracket cover, the engagement claw extending toward the front surface of the bracket body; and a wall surface formed on the bracket body, the wall surface receiving the engagement claw when the bracket cover is set at the second position, thereby restraining the movement of the bracket cover from the second position to the first position. When the engagement claw is received on the wall surface, the bracket cover is firmly held at the second position.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
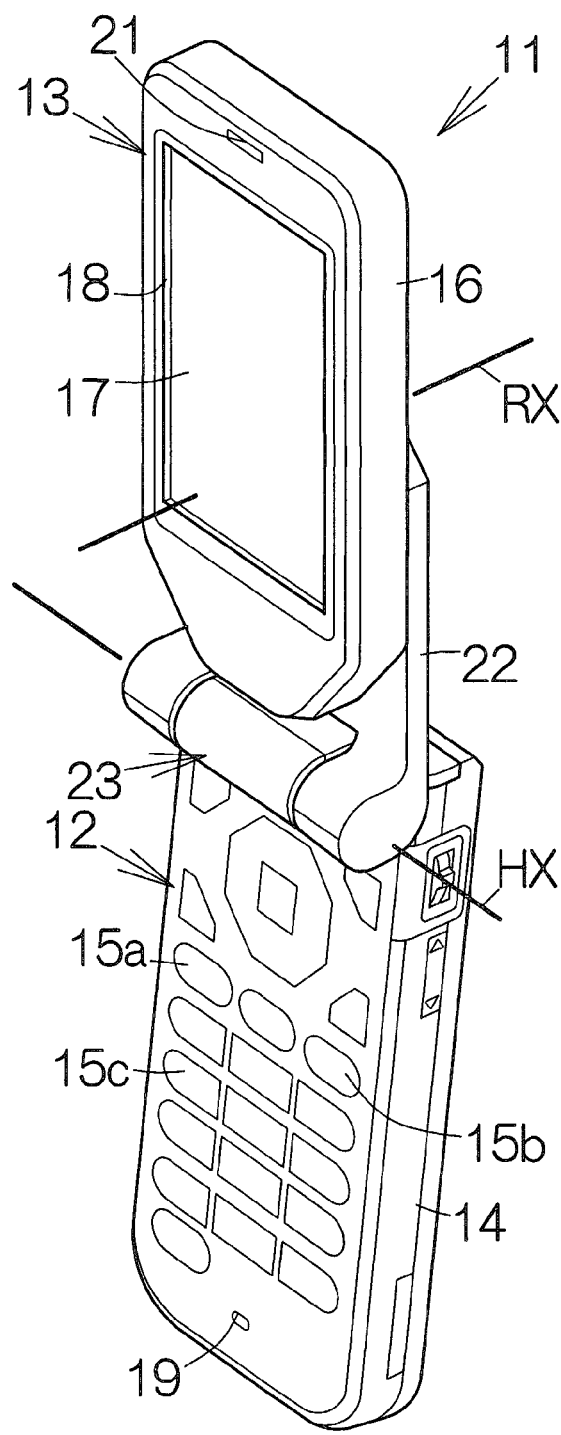
FIG. 1 is a perspective view schematically illustrating a cellular or mobile phone terminal as a specific example of an electronic apparatus according to the present invention.

FIG. 1 schematically illustrates a cellular or mobile phone terminal 11 of the clamshell type as an example of an electronic apparatus according to an embodiment of the present invention. The mobile phone terminal 11 includes a main apparatus 12 and a display unit 13. The main apparatus 12 includes a main body enclosure 14 serving as a first enclosure. A printed circuit board, not shown, is incorporated in the main body enclosure 14. Processing circuits, such as a central processing unit (CPU) and a memory, are mounted on the printed circuit board in a conventional manner. Keypads, such as an on-hook keypad 15a, an off-hook keypad 15b, numeric keypads 15c, and the like, are embedded in the flat front surface of the main apparatus 12. The CPU executes various processing in response to the manipulation of the keypads. The main body enclosure 14 may be molded from a reinforced resin material such as acrylonitrile butadiene styrene (ABS), for example.

The display unit 13 includes a display enclosure 16 serving as a second enclosure. A flat display panel module such as a liquid crystal display (LCD) panel module 17 is incorporated in the display enclosure 16. A window opening 18 is defined in the flat front surface of the display enclosure 16. The LCD panel module 17 defines a screen exposed in the window opening 18. Various texts and graphics are displayed on the screen of the LCD panel module 17 in response to the operation of the CPU. The display enclosure 16 may be molded from a reinforced resin material such as acrylonitrile butadiene styrene (ABS), for example.

A microphone hole 19 is defined in the flat front surface of the main body enclosure 14. A microphone is placed within the microphone hole 19. A speaker hole 21 is defined in the flat front surface of the display enclosure 16. A speaker is placed within the speaker hole 21. The user of the mobile phone terminal 11 speaks to the microphone during telephone conversation. The speaker reproduces the voice of the other party.

A hinge bracket 22 is coupled to the main body enclosure 14. A hinge 23 is utilized to couple the hinge bracket 22. The hinge 23 allows relative rotation around a first rotation axis HX between the main body enclosure 14 and the hinge bracket 22. The first rotation axis HX is designed to extend in parallel with the flat front surface of the main body enclosure 14.

The back surface of the display enclosure 16 is superposed on the front surface of the hinge bracket 22. The display enclosure 16 is coupled to the hinge bracket 22 for relative rotation around a second rotation axis RX. The second rotation axis RX is designed to extend within an imaginary plane perpendicular to the first rotation axis HX. The second rotation axis RX is also designed to intersect with the front surface of the hinge bracket 22. Here, the intersecting angle is set at 90 degrees between the second rotation axis RX and the front surface of the hinge bracket 22. The display enclosure 16 is in this manner allowed to rotate relative to the main body enclosure 14 around the first rotation axis HX.

When the mobile phone terminal 11 is set in an opened attitude, the main apparatus 12 and the display unit 13 face front. A portrait screen is established in the LCD panel module 17 while the main apparatus 12 is set in a vertical attitude. The user of the mobile phone terminal 11 is allowed to look at the keypads such as the numeric keypads 15c while he/she keeps looking at the portrait screen of the LCD panel module 17. The display enclosure 16 is rotatable around the first rotation axis HX. Such a rotation of the display enclosure 16 enables superposition of the display enclosure 16 on the flat front surface of the main body enclosure 14. The mobile phone terminal 11 thus takes a closed attitude. The mobile phone terminal 11 is set in a folded state in this manner.

Figure 2:
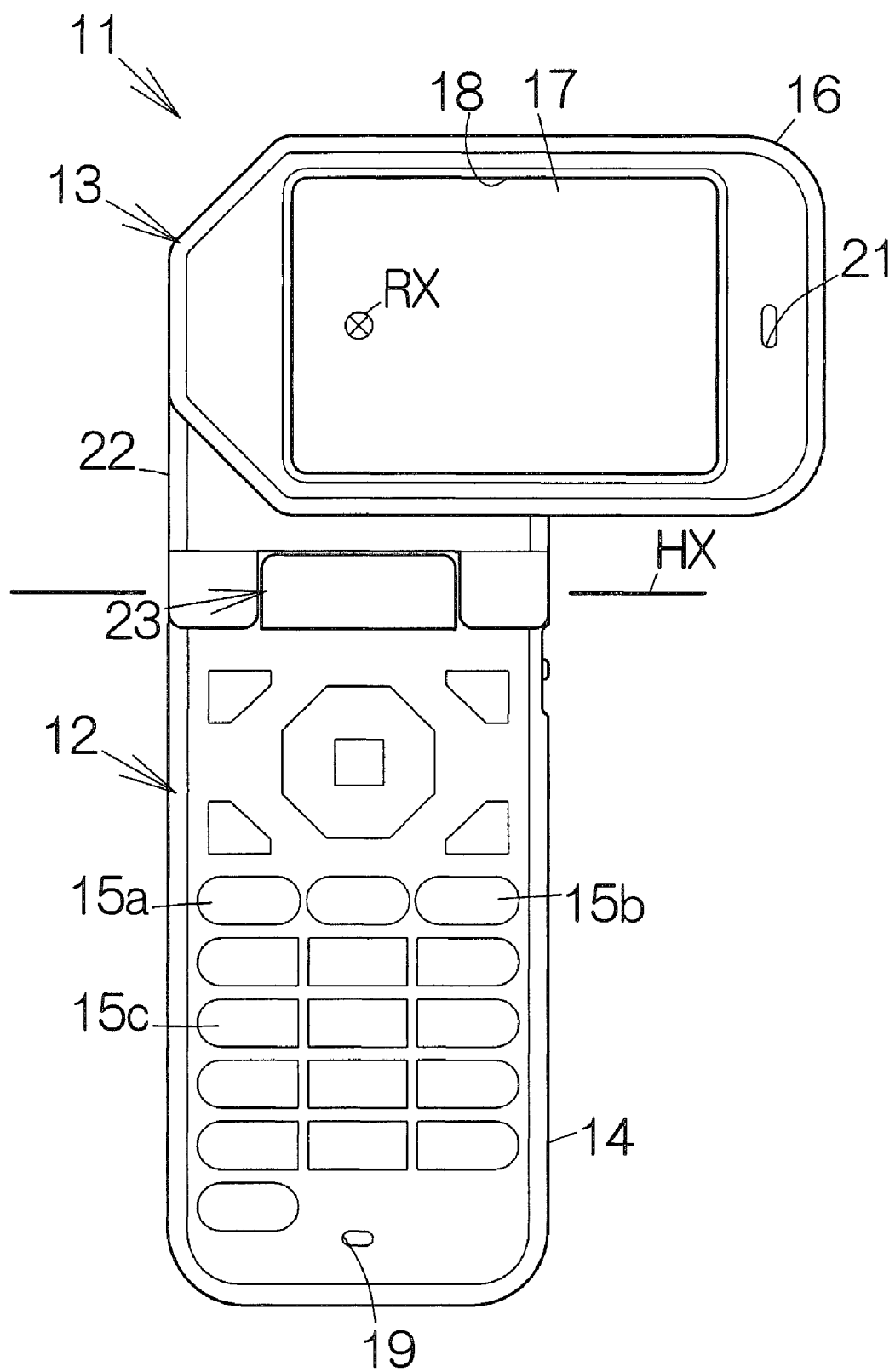
FIG. 2 is a front view schematically illustrating a first pivotal attitude of a display enclosure.
Figure 3:
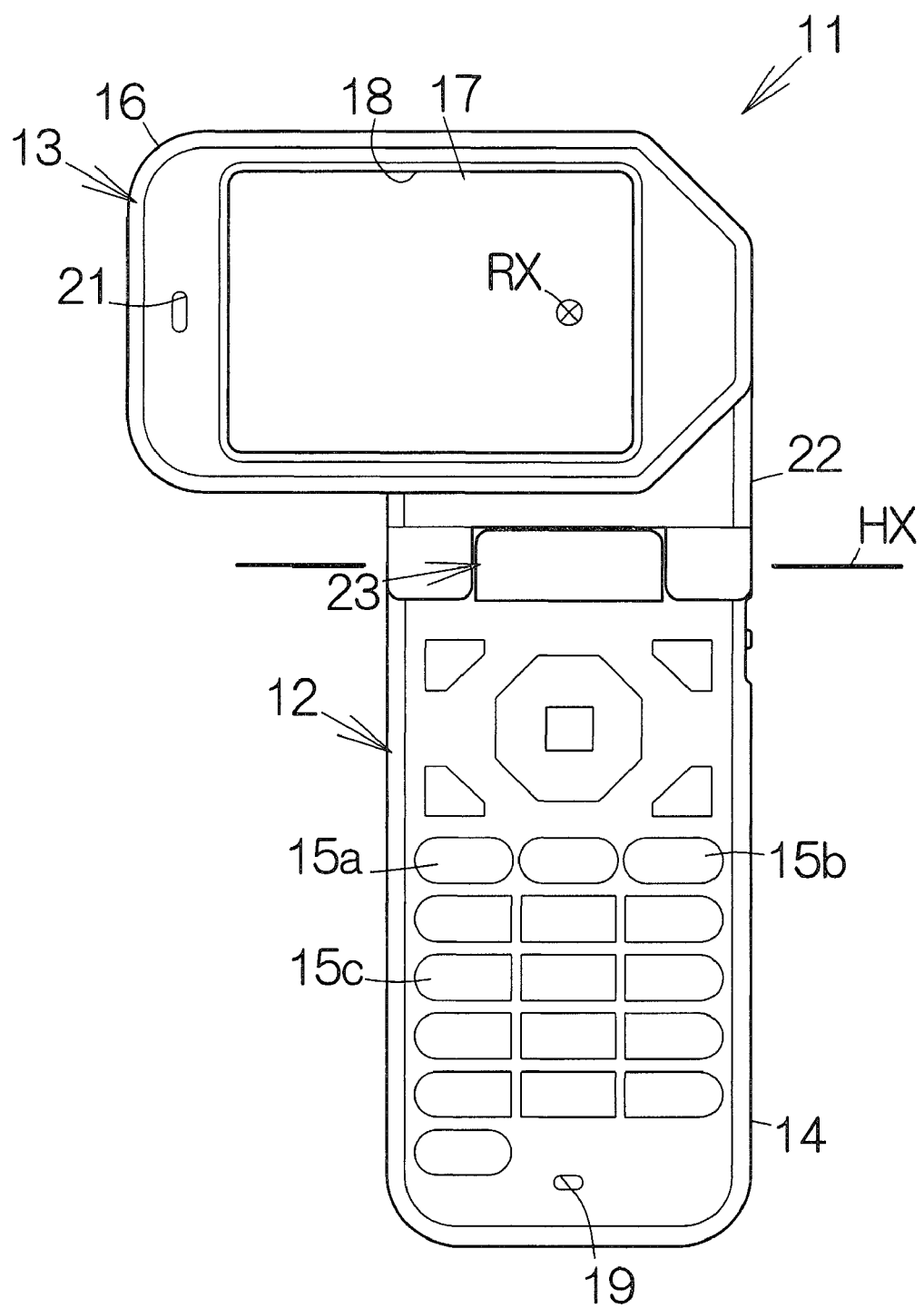
FIG. 3 is a front view schematically illustrating a second pivotal attitude of the display enclosure.

When the mobile phone terminal 11 takes the opened attitude, the display enclosure 16 is allowed to rotate around the second rotation axis RX, for example. When the display enclosure 16 rotates in the clockwise direction, namely a first direction, by the rotation angle of 90 degrees, as shown in FIG. 2, from the upright attitude where the display panel module 17 provides the portrait screen, the display enclosure 16 takes a first pivotal attitude. The landscape screen is established in the LCD panel module 17. When the display enclosure 16 rotates in the anticlockwise direction, namely a second direction, by the rotation angle of 90 degrees, from the upright attitude, the display enclosure 16 takes a second pivotal attitude, as shown in FIG. 3. The landscape screen is established in the LCD panel module 17.

Figure 4:
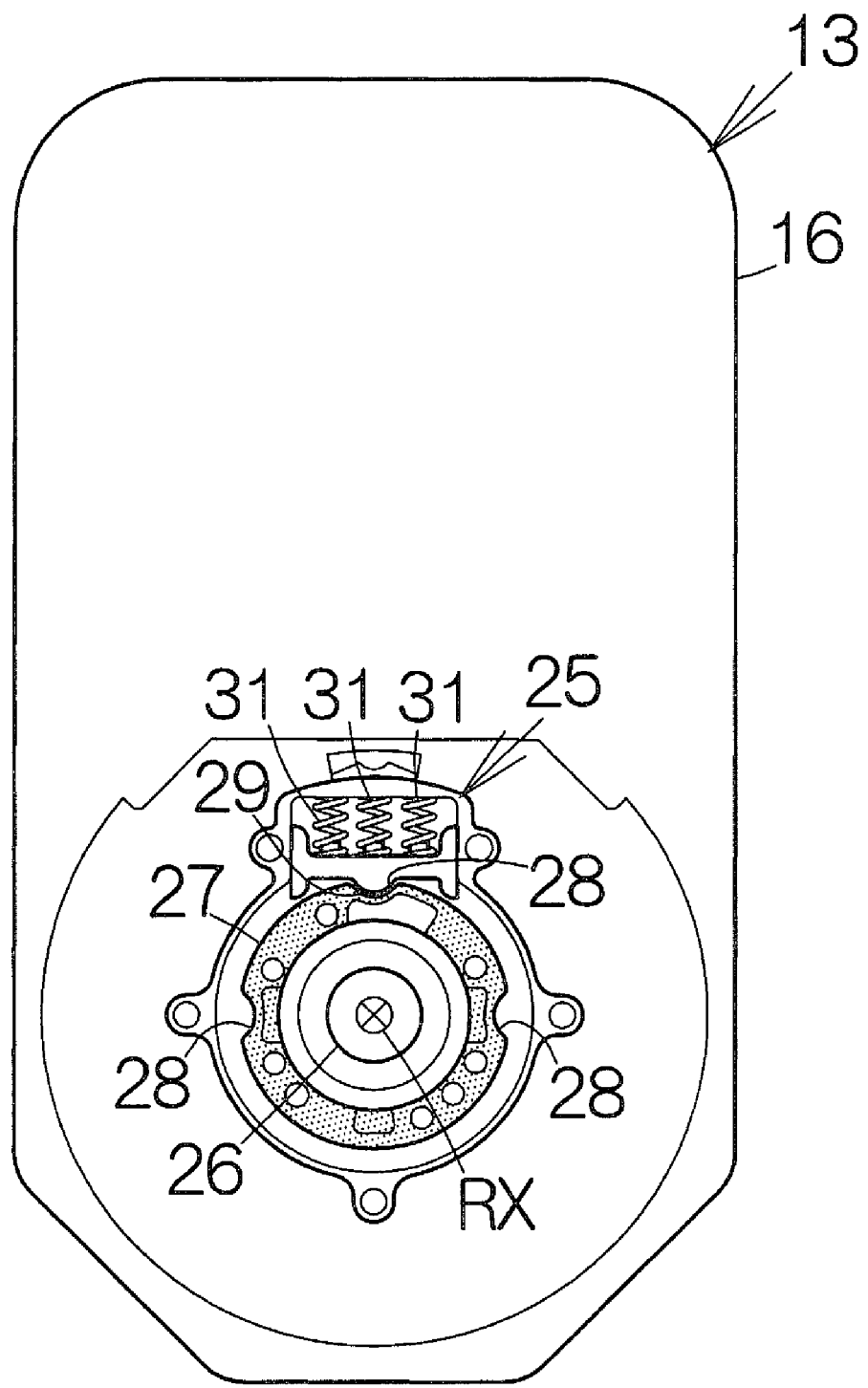
FIG. 4 is a backside view schematically illustrating the structure of the display enclosure.

As shown in FIG. 4, a swivel mechanism 25 is incorporated in the back surface of the display enclosure 16. The swivel mechanism 25 includes a hollow cylindrical shaft 26 having the central axis concentric with the second rotation axis RX. The hollow cylindrical shaft 26 is stationary fixed to the display enclosure 16. An annular member 27 is mounted on the hollow cylindrical shaft 26 for relative rotation around the hollow cylindrical shaft 26. The annular member 27 is prevented from an axial movement relative to the hollow cylindrical shaft 26. Specifically, the annular member 27 is prevented from falling off. The hinge bracket 22 is fixed to the annular member 27. Relative rotation is restrained between the hinge bracket 22 and the annular member 27 around the hollow cylindrical shaft 26. Relative rotation between the hollow cylindrical shaft 26 and the annular member 27 thus enables relative rotation between the display enclosure 16 and the hinge bracket 22.

Three depressions 28 are formed on the outer edge of the annular member 27 at constant intervals of the central angle of 90 degrees. The depressions 28 are depressed toward the central axis of the hollow cylindrical shaft 26, namely the second rotation axis RX. The depressions 28 are respectively defined based on arched edges of the annular member 27, for example. An arched protrusion 29 is opposed to the outer edge of the annular member 27. Three tensile springs 31 are utilized to urge the protrusion 29 toward the second rotation axis RX, for example. The protrusion 29 is received in one of the depressions 28. The combination of the protrusion 29 and the depressions 28 in this manner serves to restrain the relative rotation between the display enclosure 16 and the hinge bracket 22 at a desired position. The display enclosure 16 in this manner clicks on the hinge bracket 22 around the second rotation axis RX.

Figure 5:
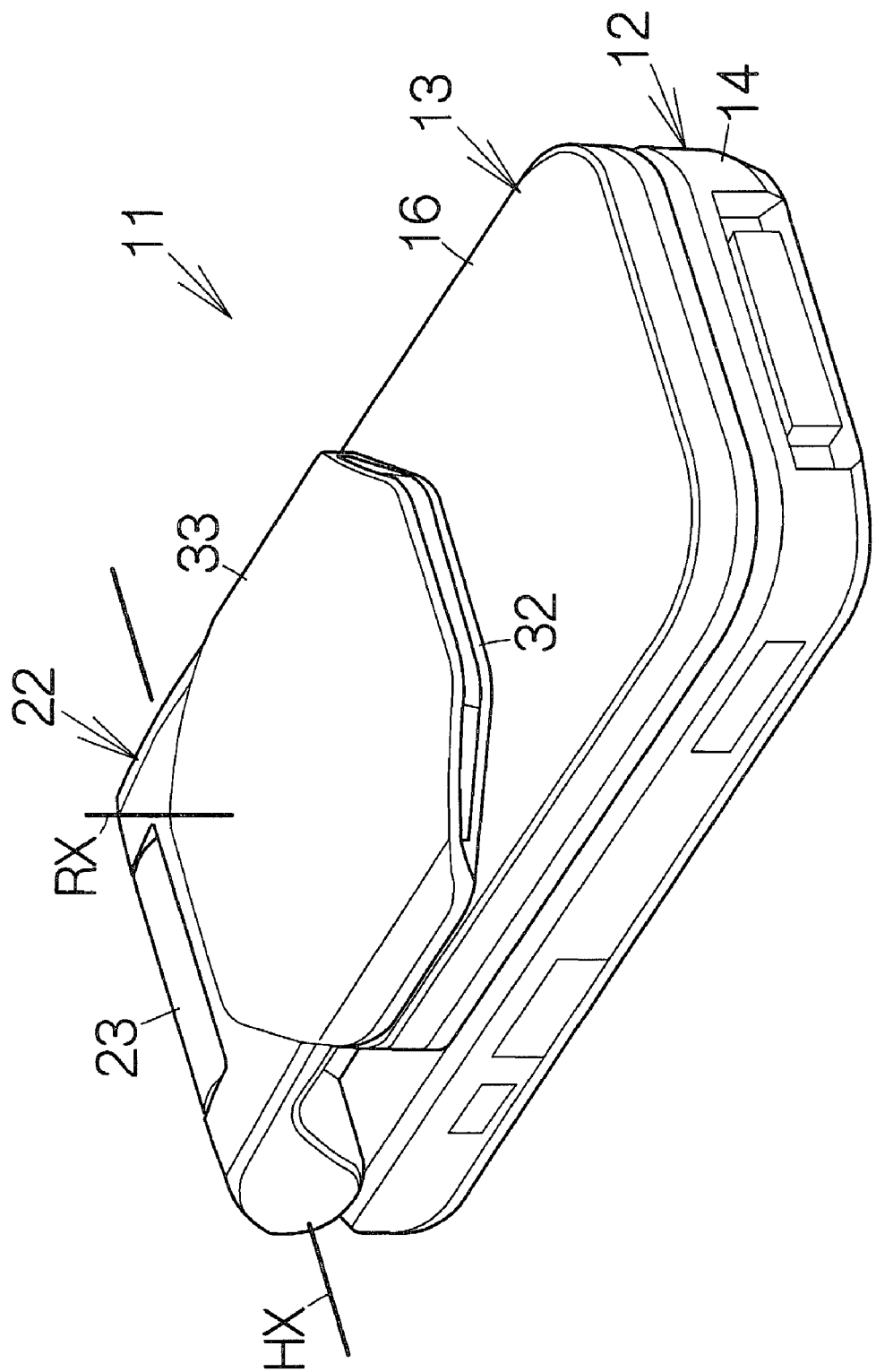
FIG. 5 is a perspective view schematically illustrating the structure of the display enclosure.

As shown in FIG. 5, the hinge bracket 22 includes a bracket body 32. The bracket body 32 is superposed on the back surface of the display enclosure 16. The front surface of the bracket body 32 is coupled to the swivel mechanism 25. A bracket cover 33 covers over the back surface of the bracket body 32. The bracket cover 33 is capable of realizing a predetermined elastic deformation.

Figure 6:
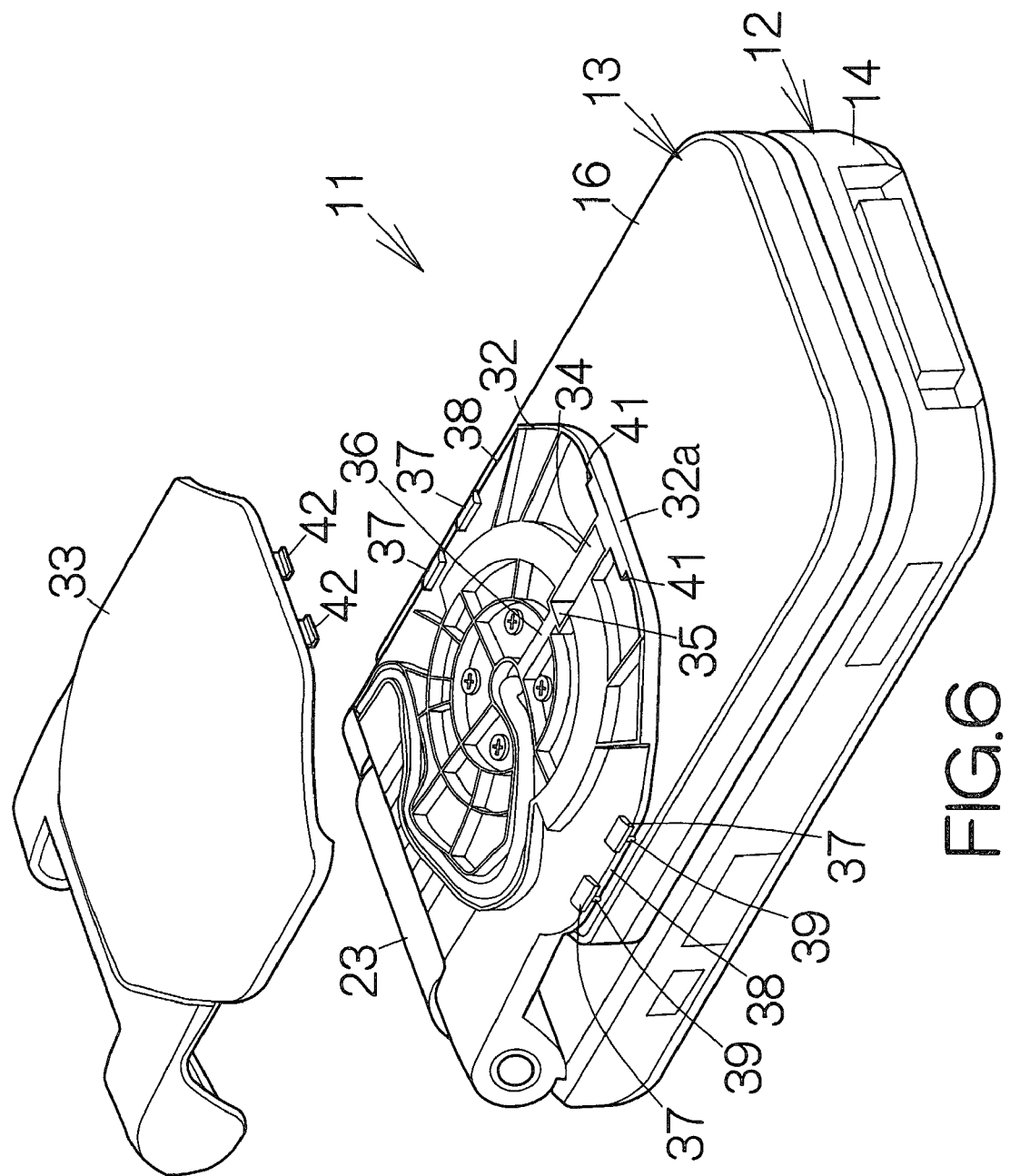
FIG. 6 is an exploded view schematically illustrating a bracket body when a bracket cover is detached.

As shown in FIG. 6, an opening 34 is defined in the bracket body 32. The opening 34 is designed to define the inner space in the form of a parallelepiped, for example. The opening 34 extends in the longitudinal direction of the bracket body 32. A wall surface 35 is defined at the rear end of the opening 34.

The wall surface 35 stands upright from the back surface of the display enclosure 16. A setting 36 is defined at a position behind the wall surface 35. Is should be noted that a recess may be formed in the bracket body 32 in place of the opening 34.

Two pairs of attachment claws 37 are formed on the back surface of the bracket body 32, for example. The attachment claws 37 in a pair are designed to extend from the peripheral edges 38 of the bracket body 32 in the opposite directions along an imaginary plane including the back surface of the bracket body 32. The peripheral edges 38 at least partly extend on a pair of parallel lines, respectively. Swells 39 are formed on the peripheral edges 38. The swells 39 are designed to extend on the peripheral edges 38 from the corresponding attachment claws 37 to the front surface of the bracket body 32, respectively. The swells 39 are formed in the shape of a semicolumn, for example. The attachment claws 37 and the swells 39 may be formed integral with the bracket body 32.

The bracket body 32 includes a wall 32a standing upright from the back surface of the display enclosure 16. A pair of engagement pieces 41 is formed on the wall 32a of the bracket body 32. The engagement pieces 41 protrude toward the hinge 23 in parallel with the back surface of the bracket body 32. The engagement pieces 41 are opposed to the back surface of the bracket body 32 at a predetermined distance. The engagement piece 41 in this manner respectively forms an insertion space between the bracket body 32 and the engagement piece 41 itself. The engagement pieces 41 may be formed integral with the bracket body 32.

A pair of hook pieces 42 is formed on the back surface of the bracket cover 33. The hook pieces 42 protrude forward toward the front end of the bracket cover 33. The hook pieces 42 are engaged with the engagement pieces 41 of the bracket body 32, respectively, as described later. The hook pieces 42 may be formed integral with the bracket cover 33.

Figure 7:
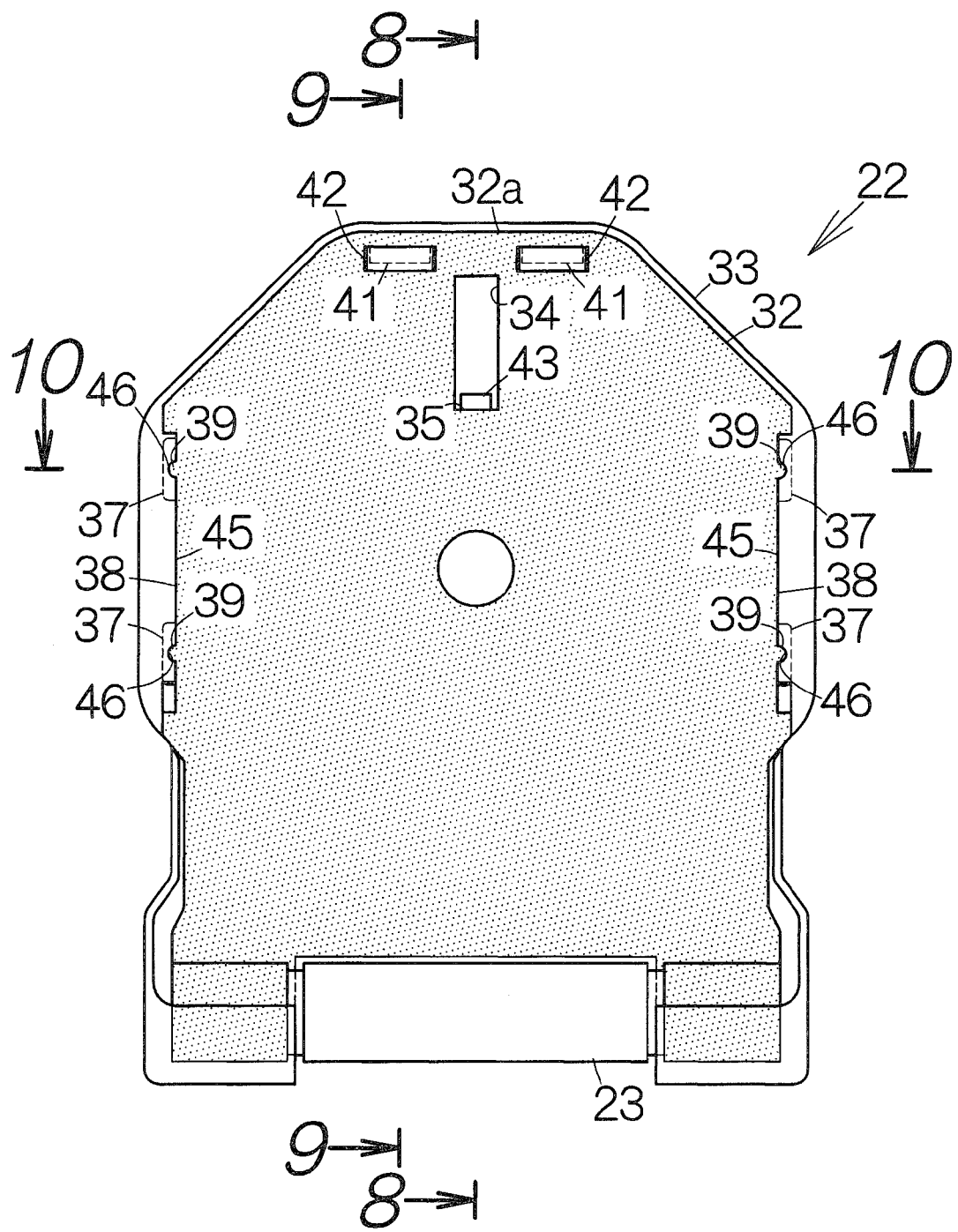
FIG. 7 is a backside view schematically illustrating the bracket body observed from the back surface of the bracket body.
Figure 8:
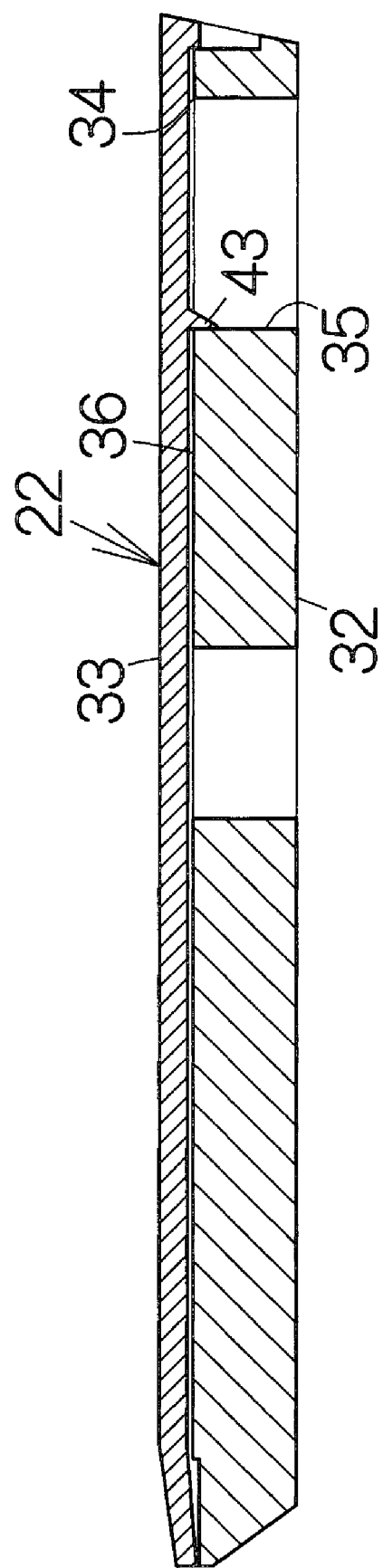
FIG. 8 is a sectional view taken along the line 8-8 in FIG. 7.

FIG. 7 schematically illustrates the back surface of the hinge bracket 22. An engagement claw 43 stands upright from the back surface of the bracket cover 33. The engagement claw 43 is received in the opening 34. The engagement claw 43 may be formed integral with the bracket cover 33. Referring also to FIG. 8, the engagement claw 43 is received on the wall surface 35 within the opening 34. The combination of the engagement claw 43 and the wall surface 35 enables restraint of the movement of the bracket cover 33 toward the hinge 23.

Figure 9:
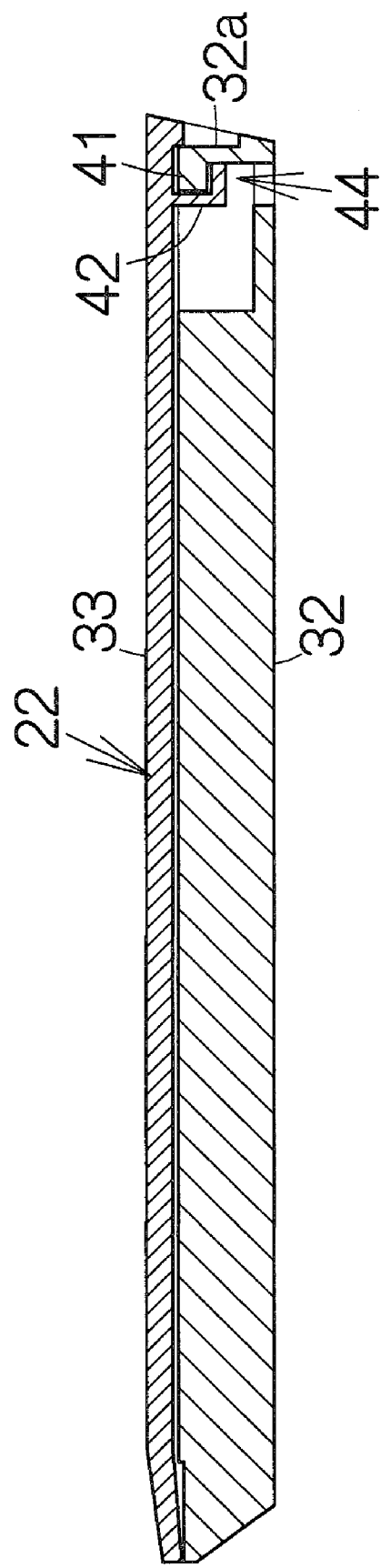
FIG. 9 is a sectional view taken along the line 9-9 in FIG. 7.

The hook pieces 42 of the bracket cover 33 are engaged with the engagement pieces 41 of the bracket body 32. Referring also to FIG. 9, each of the hook pieces 42 is inserted in the insertion space 44 defined between the corresponding engagement piece 41 and the bracket body 32. The bracket cover 33 is restrained from separating from the bracket body 32 in the vertical direction perpendicular to the back surface of the bracket body 32.

Figure 10:
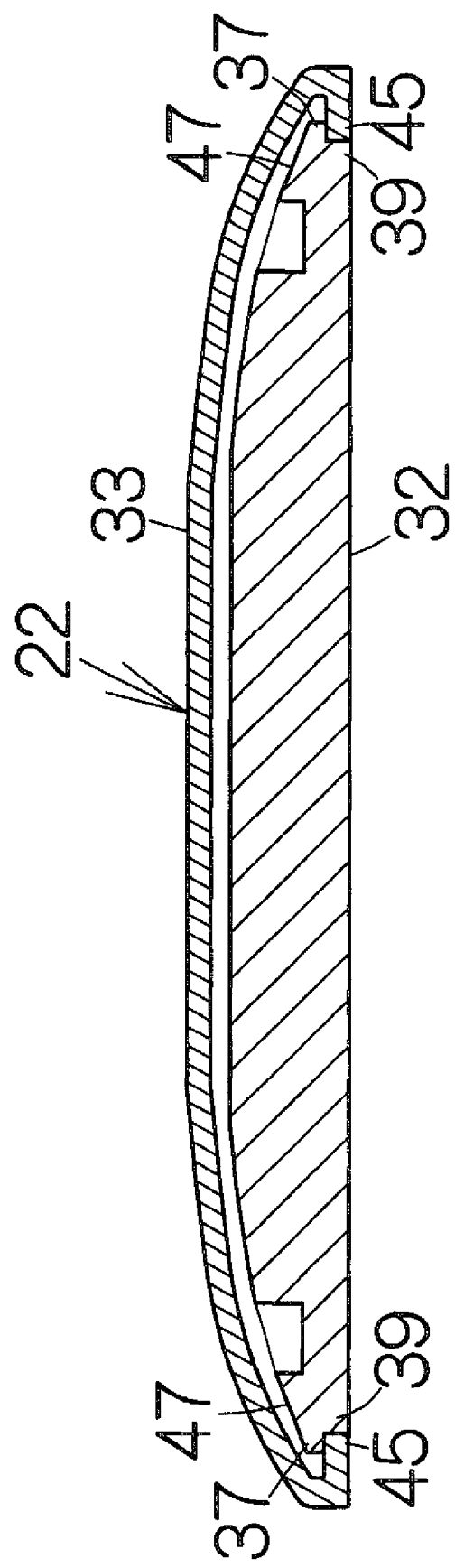
FIG. 10 is a sectional view taken along the line 10-10 in FIG. 7.

The attachment claws 37 are engaged with guiding pieces 45 formed in the bracket cover 33. The guiding pieces 45 respectively engage with the attachment claws 37 at the surface facing away from the bracket cover 33. Recesses 46 are formed on the edges of the guiding pieces 45. The swells 39 of the bracket body 32 are received in the corresponding recesses 46, respectively. Referring also to FIG. 10, an inclined surface 47 is formed on the individual attachment claw 37. The inclined surface 47 gradually gets closer to the aforementioned imaginary plane as the position gets farther in the outward direction from the peripheral edge of the bracket body 32.

Figure 11:
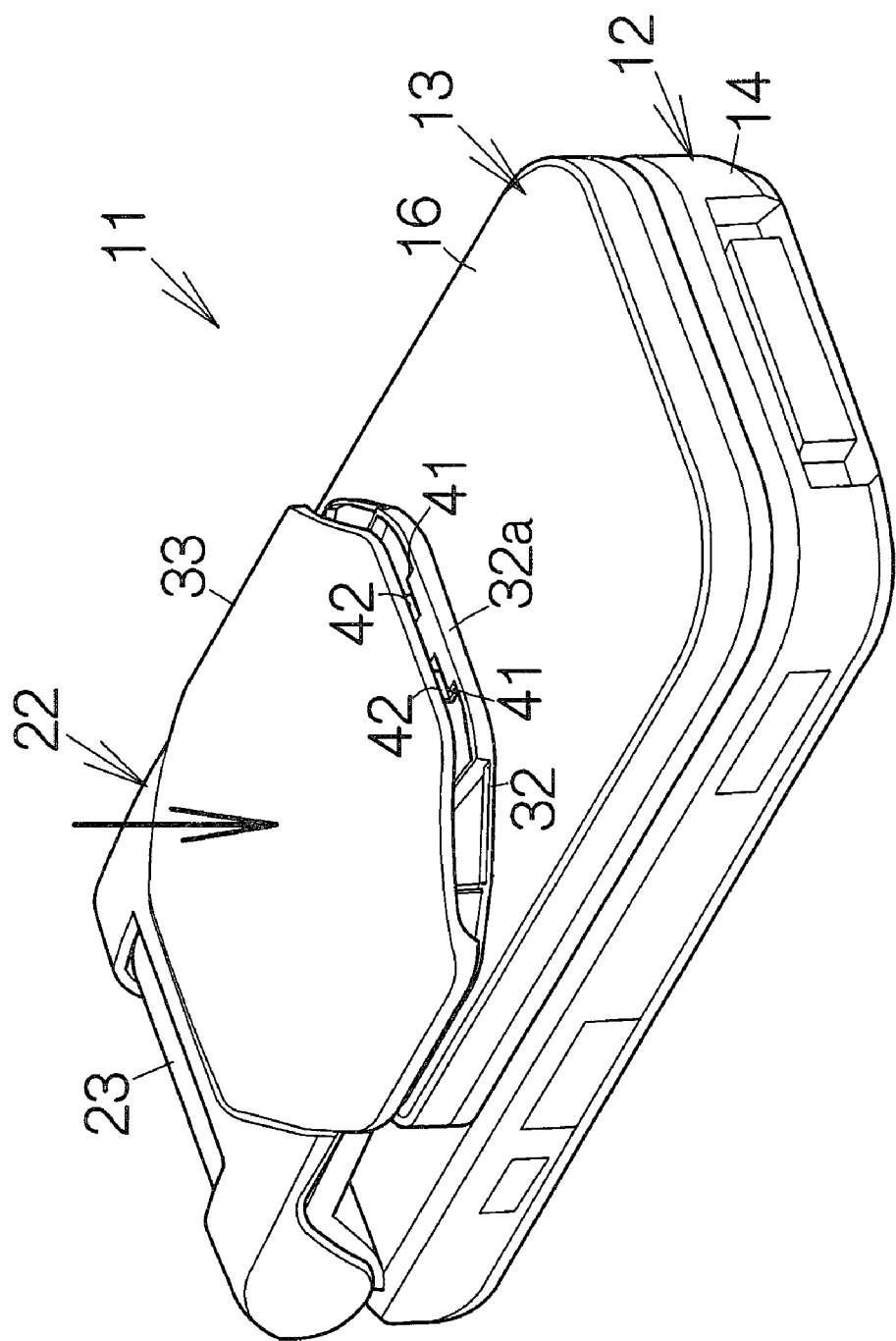
FIG. 11 is a perspective view schematically illustrating the bracket body when the bracket cover is attached.
Figure 12:
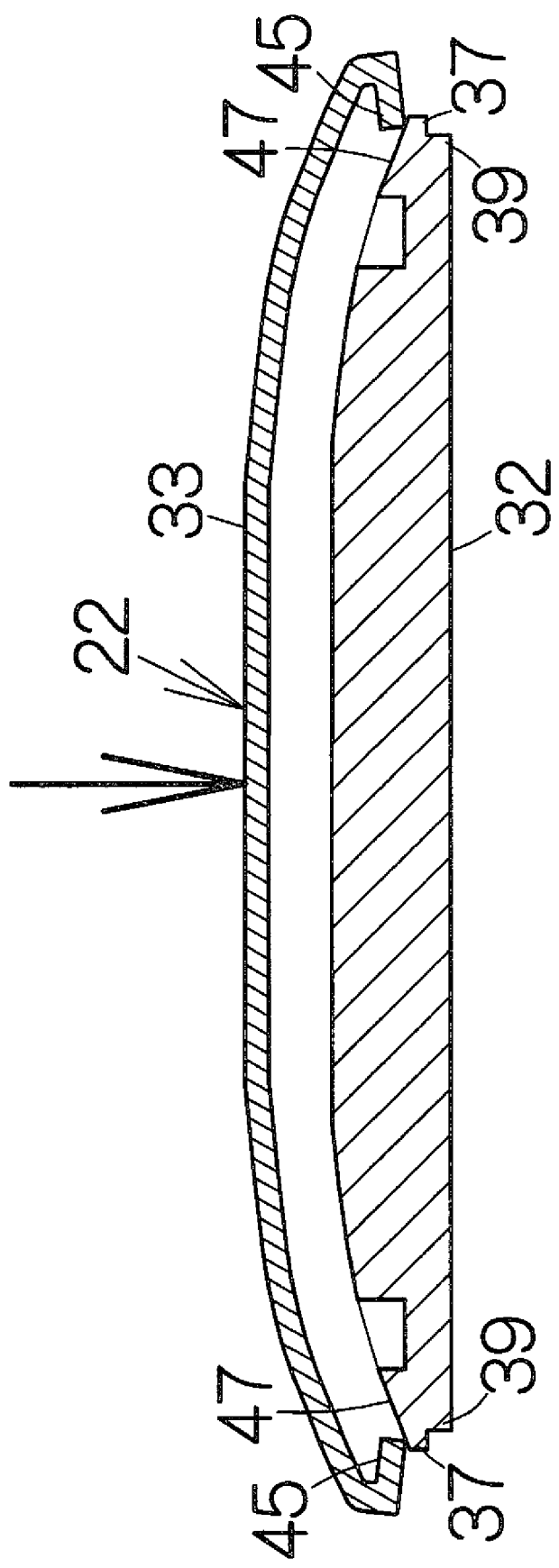
FIG. 12 is a sectional view, corresponding to FIG. 10, schematically illustrating the attachment of the bracket cover to the bracket body.

Now, assume that the bracket cover 33 is to be attached to the bracket body 32. As shown in FIG. 11, an urging force is applied to the bracket cover 33 against the back surface of the bracket body 32. As shown in FIG. 12, the guiding pieces 45 are forced to slide on the inclined surfaces 47 of the attachment claws 37. The urging force causes an elastic deformation of the bracket cover 33. The guiding pieces 45 are finally engaged with the attachment claws 37. The bracket cover 33 is held on the bracket body 32 at a first position in this manner. The hook pieces 42 are set at positions at the rear of the insertion space 44.

Figure 13:
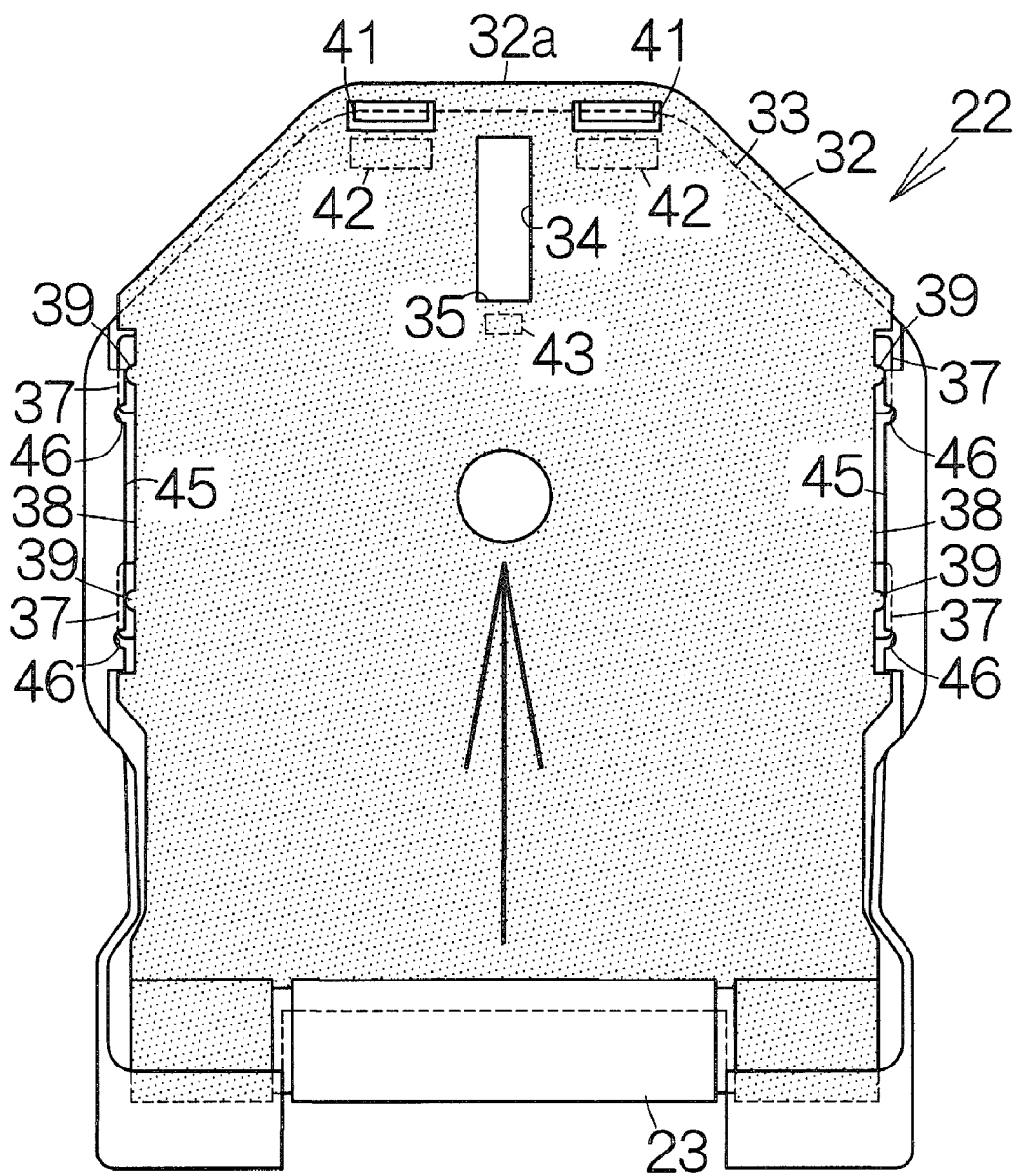
FIG. 13 is a sectional view, corresponding to FIG. 7, schematically illustrating the attachment of the bracket cover to the bracket body.
Figure 14:
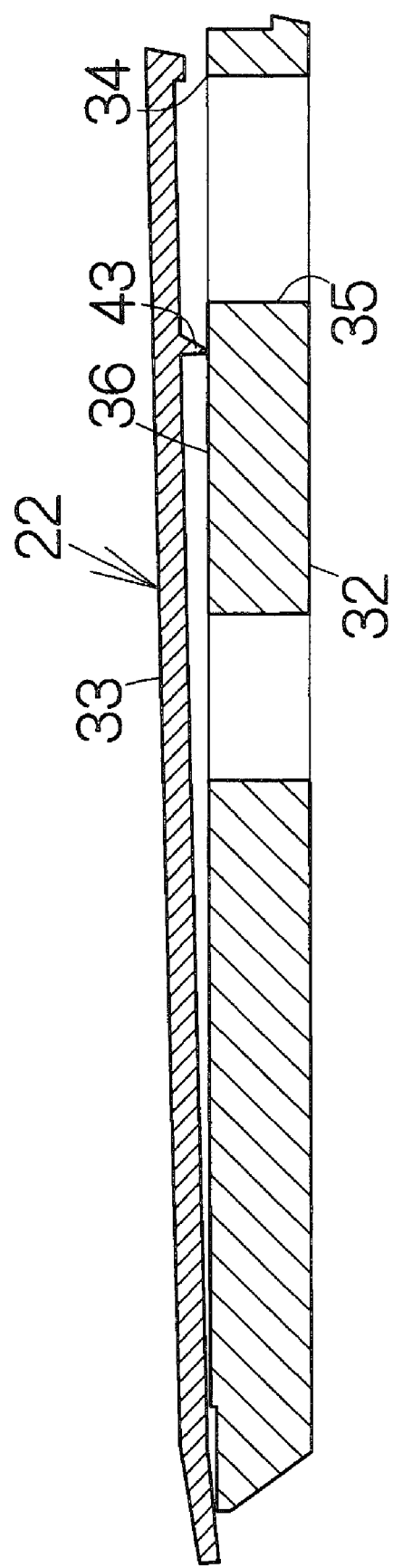
FIG. 14 is a sectional view, corresponding to FIG. 8, schematically illustrating the attachment of the bracket cover to the bracket body.

As shown in FIG. 13, the edges of the guiding pieces 45 are received on the swells 39. As shown in FIG. 14, the engagement claw 43 is received on the setting 36. The bracket cover 33 is then forced to slide forward toward the front end of the bracket body 32 along the guiding pieces 45. The swells 39 are received in the recesses 46 of the guiding pieces 45. The engagement claw 43 is received in the opening 34. The rear end of the engagement claw 43 is received on the wall surface 35. The hook pieces 42 are allowed to enter the insertion spaces 44 between the corresponding engagement pieces 41 and the bracket body 32, respectively. The bracket cover 33 is in this manner set at a second position.

When the bracket cover 33 is set at the second position in the mobile phone terminal 11, the engagement between the engagement pieces 41 and the hook pieces 42 as well as the engagement between the engagement claw 43 and the wall surface 35 serves to hold the bracket cover 33 on the bracket body 32 in combination with the action of the guiding pieces 45. The bracket cover 33 is thus firmly held on the bracket body 32 when the bracket cover 33 is set at the second position. The bracket cover 33 is thus reliably prevented from detachment from the bracket body 32.

In addition, the inclined surface 47 is formed on the attachment claws 37. The guiding pieces 45 are allowed to slide on the corresponding inclined surfaces 47 when the bracket cover 33 is urged against the bracket body 32 for attachment of the bracket cover 33 to the bracket body 32. The bracket cover 33 is caused to gradually deform elastically. The guiding pieces 45 are thus engaged with the attachment claws 37 in a facilitated manner.

What is claimed is:

1. An electronic apparatus comprising:
    a first enclosure;
    a bracket body coupled to the first enclosure for relative rotation around a first rotation axis parallel to a flat front surface of the first enclosure, the bracket body defining peripheral edges at least partly extending along a pair of parallel lines, respectively;
    a second enclosure superposed on a front surface of the bracket body, the second enclosure coupled to the bracket body for relative rotation around a second rotation axis intersecting with the front surface of the bracket body;
    a bracket cover covering over a back surface of the bracket body;
    at least a pair of attachment claws formed on the back surface of the bracket body, the attachment claws extending from the peripheral edges of the bracket body in opposite directions along an imaginary plane including the back surface of the bracket body;
    a pair of guiding pieces formed on the bracket cover to engage with the attachment claws respectively at a surface facing away from the bracket cover, the guiding pieces guiding at least movement of the bracket cover along the peripheral edges of the bracket body between first and second positions;
    an engagement piece formed on the bracket body at a position opposed to the back surface of the bracket body at a predetermined distance, the engagement piece forming an insertion space between the bracket body and the engagement piece itself; and a hook piece formed on the bracket cover, the hook piece exiting from the insertion space when the bracket cover is set at the first position, the hook piece entering the insertion space when the bracket cover is set at the second position.

2. The electronic apparatus according to claim 1, wherein the attachment claws each define an inclined surface gradually getting closer to the imaginary plane as position gets farther in an outward direction from the peripheral edge of the bracket body.

3. The electronic apparatus according to claim 1, further comprising:

a swell extending on the peripheral edge of the bracket body from the attachment claw to the front surface of the bracket body; and a recess formed on an edge of the guiding piece, the recess receiving the swell on the attachment claw when the bracket cover is set at the second position.

4. The electronic apparatus according to claim 1, further comprising:

an engagement claw formed on the bracket cover, the engagement claw extending toward the front surface of the bracket body; and a wall surface formed on the bracket body, the wall surface receiving the engagement claw when the bracket cover is set at the second position, thereby restraining the movement of the bracket cover from the second position to the first position.

5. The electronic apparatus according to claim 1, wherein the bracket cover accepts a predetermined elastic deformation.

* * * * *